United States Patent
Ko et al.

(10) Patent No.: US 11,312,855 B2
(45) Date of Patent: Apr. 26, 2022

(54) RESIN COMPOSITION CONTAINING POLYVINYL CHLORIDE RESIN AND ACRYLIC RESIN AND BOARD FOR INTERIOR MATERIALS MANUFACTURED USING THE SAME

(71) Applicant: LG HAUSYS, LTD., Seoul (KR)

(72) Inventors: Hae Seung Ko, Seoul (KR); Seung Baik Nam, Seoul (KR); Myeong Seok Park, Seoul (KR); Woo Kyung Jang, Seoul (KR); Woo Chul Jung, Seoul (KR)

(73) Assignee: LG Hausys, Ltd., Seoul (KR)

( * ) Notice: Subject to any disclaimer, the term of this patent is extended or adjusted under 35 U.S.C. 154(b) by 442 days.

(21) Appl. No.: 16/337,285

(22) PCT Filed: Mar. 14, 2018

(86) PCT No.: PCT/KR2018/002981
§ 371 (c)(1),
(2) Date: Mar. 27, 2019

(87) PCT Pub. No.: WO2018/174460
PCT Pub. Date: Sep. 27, 2018

(65) Prior Publication Data
US 2021/0230418 A1    Jul. 29, 2021

(30) Foreign Application Priority Data

Mar. 22, 2017   (KR) .................. 10-2017-0035828
Mar. 13, 2018   (KR) .................. 10-2018-0029397

(51) Int. Cl.
*C08L 33/12*    (2006.01)
*C08K 3/26*     (2006.01)
*C08K 5/00*     (2006.01)
*C08L 27/06*    (2006.01)
*C08L 33/08*    (2006.01)

(52) U.S. Cl.
CPC ................. *C08L 33/12* (2013.01); *C08K 3/26* (2013.01); *C08K 5/0016* (2013.01); *C08L 27/06* (2013.01); *C08L 33/08* (2013.01); *C08K 2003/265* (2013.01)

(58) Field of Classification Search
CPC .................................. C08L 27/06; C08L 33/12
See application file for complete search history.

(56) References Cited

U.S. PATENT DOCUMENTS

| | | | | |
|---|---|---|---|---|
| 2,311,249 A | * | 2/1943 | Powell ............... | C09D 127/06 525/222 |
| 3,316,192 A | * | 4/1967 | Seibel ............... | C08K 5/005 524/114 |
| 3,595,819 A | * | 7/1971 | Dakli et al. ......... | C08L 33/12 524/143 |
| 3,629,050 A | * | 12/1971 | Weinstein ......... | A43B 23/086 428/90 |
| 4,113,681 A | * | 9/1978 | Harmuth ........... | C09D 127/06 523/437 |
| 4,247,663 A | * | 1/1981 | Yoshiga ............. | C08L 27/06 156/85 |
| 4,699,948 A | * | 10/1987 | Kishida ............ | C08L 27/06 525/81 |
| 5,194,498 A | * | 3/1993 | Stevenson ......... | C08F 285/00 525/81 |
| 5,312,575 A | * | 5/1994 | Wills ................. | C08F 285/00 264/109 |
| 5,319,028 A | * | 6/1994 | Nakamura ......... | C08F 265/04 525/227 |
| 6,380,296 B1 | * | 4/2002 | Inada ................ | C08L 23/02 524/445 |
| 2002/0198276 A1 | * | 12/2002 | Sunagawa ......... | C08J 9/08 521/134 |
| 2003/0003317 A1 | | 1/2003 | Chang et al. | |
| 2003/0027881 A1 | * | 2/2003 | Sunagawa ......... | C08F 265/06 521/134 |
| 2005/0131123 A1 | * | 6/2005 | Hawrylko ......... | C08K 3/26 524/425 |

(Continued)

FOREIGN PATENT DOCUMENTS

CN    103146094 A    6/2013
CN    103541539 A    1/2014

(Continued)

OTHER PUBLICATIONS

Ahmed et al. (Polymer Degradation and Stability 93 (2008) 456-465) (Year: 2008).*
Saroop et al. (Journal of Applied Polymer Science, vol. 38, 1401-1419 (1989)) (Year: 1989).*

* cited by examiner

Primary Examiner — Liam J Heincer
(74) Attorney, Agent, or Firm — Dentons US LLP

(57) ABSTRACT

The present invention relates to a resin composition containing a polyvinyl chloride resin and an acrylic resin and a board for interior materials manufactured using the same. More specifically, the present invention relates to a resin composition having excellent heat resistance due to a high glass transition temperature, having high flexibility even with a low plasticizer content, and having excellent processability due to such properties, as compared with the case wherein a polyvinyl chloride resin is used alone, and to a board for interior materials manufactured using the resin composition. According to the present invention, the resin composition may be applied to both a calendering method and an extrusion method due to excellent processability thereof.

13 Claims, No Drawings

(56) References Cited

U.S. PATENT DOCUMENTS

| | | | |
|---|---|---|---|
| 2007/0100044 A1* | 5/2007 | Jeon | C08F 14/06 |
| | | | 524/284 |
| 2009/0023864 A1* | 1/2009 | Sato | C08L 33/06 |
| | | | 525/228 |
| 2015/0322236 A1* | 11/2015 | Csihony | C08K 5/01 |
| | | | 524/567 |
| 2018/0015704 A1* | 1/2018 | Ko | B32B 19/04 |

FOREIGN PATENT DOCUMENTS

| | | |
|---|---|---|
| CN | 103556796 A | 2/2014 |
| KR | 1020010056683 A | 7/2001 |
| KR | 10-0598213 B1 | 6/2006 |
| KR | 1020160093192 A | 8/2016 |
| KR | 1020160093193 A | 8/2016 |
| WO | 2013097890 A1 | 7/2013 |
| WO | 2016-122136 A1 | 8/2016 |

RESIN COMPOSITION CONTAINING POLYVINYL CHLORIDE RESIN AND ACRYLIC RESIN AND BOARD FOR INTERIOR MATERIALS MANUFACTURED USING THE SAME

This application is a national stage of international Application No. PCT/KR2018/002981 filed Mar. 14, 2018, which claims the benefit of Korean Patent Application Nos. 10-2018-0029397, filed Mar. 13, 2018 and 10-2017-0035828 filed Mar. 22, 2017, respectively, the entire contents of which are incorporated herein by reference.

TECHNICAL FIELD

The present invention relates to a resin composition containing a polyvinyl chloride resin and an acrylic resin and a board for interior materials manufactured using the same. More specifically, the present invention relates to a resin composition having excellent heat resistance due to a high glass transition temperature, having high flexibility even with a low plasticizer content, and having excellent processability due to such properties, as compared with the case wherein a polyvinyl chloride resin is used alone, and to a board for interior materials manufactured using the resin composition. As an advantage of the resin composition of the present invention having excellent processability, both a calendering method and an extrusion method may be used to perform a manufacturing process using the resin composition.

BACKGROUND ART

Polyvinyl chloride resins are a typical general-purpose polymer widely used for flooring materials, wallpaper, pipes, window profiles, flexible films for food packaging, fiber, and the like. However, since polyvinyl chloride resins have low glass transition temperature (Tg) and low heat distortion temperature (HDT), application thereof is limited at high temperatures. For example, commercially available conventional polyvinyl chloride resins have a glass transition temperature of about 80° C.

In addition, since the formulation of a composition containing a conventional polyvinyl chloride resin is not designed so that the composition has a higher glass transition temperature than the polyvinyl chloride resin, there have been limitations in improving the physical properties of products manufactured using the composition.

In addition, when a composition containing a conventional polyvinyl chloride resin is processed, generally, a plasticizer is added to impart flexibility by lowering a glass transition temperature, or the composition is processed to have a profile or pipe form without addition of a plasticizer.

In the case of a polyvinyl chloride resin composition containing a plasticizer, since the plasticizer-containing composition has excellent processability due to flexibility thereof, a calendering method with high productivity may be used to process the composition. On the other hand, in the case of a polyvinyl chloride resin composition not containing a plasticizer, since the plasticizer-free composition lacks flexibility and is hard, an extrusion method is generally used. However, the extrusion method is significantly less productive than the calendering method.

Therefore, a manufacturing method is determined depending on the presence or absence of a plasticizer, and the physical properties and productivity of a product vary greatly depending on the manufacturing method.

As an example of increasing the heat resistance of polyvinyl chloride resins, a polyether ketone compatible with polyvinyl chloride resins and having a hyperbranched structure capable of melt blending and a heat-resistant polyvinyl chloride blend including the polyether ketone are disclosed in KR 10-2001-0056683 A.

However, the heat-resistant polyvinyl chloride blend of the prior art is mainly used to manufacture pipes for hot water piping, and use thereof is very limited.

In addition, hard board materials used to manufacture interior materials such as flooring materials and closet materials include plywood, high-density fiberboard (HDF), medium-density fiberboard (MDF), inorganic boards, fiber boards, and the like. The above-described boards have respective drawbacks. Wood-based boards such as plywood, HDF, and MDF are poor in water resistance, and inorganic boards need to be lightweight due to high specific gravity thereof. In fiber boards, dimension reinforcing fiber and a polymer binder are contained in a certain mixing ratio. In this case, due to the burrs of the reinforcing fiber, it is difficult to form grooves for fastening a board processed to have a predetermined size.

When a hard board for flooring materials and closet materials is manufactured using a polyvinyl chloride resin, due to the low glass transition temperature of the polyvinyl chloride resin, the hard board is vulnerable to heat distortion during long-term use.

Therefore, a polyvinyl chloride resin composition applicable to manufacture of boards for interior materials such as flooring materials and closet materials, having excellent heat resistance and high flexibility, having excellent processability due to such properties, and applicable to both a calendering method and an extrusion method due to excellent processability thereof needs to be developed.

PRIOR ART DOCUMENT

[Patent Document] (Patent Document 1) KR 10-2001-0056683 A (Jul. 4, 2001)

DISCLOSURE

Technical Problem

Therefore, the present invention has been made in view of the above problems, and it is one object of the present invention to provide a novel resin composition having excellent heat resistance, high flexibility even with a low plasticizer content, excellent processability due to such properties, and applicable to both a calendering method and an extrusion method due to excellent processability thereof.

It is another object of the present invention to provide a board for interior materials manufactured using the resin composition of the present invention.

Technical Solution

In accordance with one aspect of the present invention, provided is a resin composition including 5 to 70 parts by weight of an acrylic resin, 1 to 15 parts by weight of a plasticizer, and 100 to 500 parts by weight of an inorganic filler based on 100 parts by weight of a polyvinyl chloride resin.

In accordance with another aspect of the present invention, provided is a board for interior materials manufactured using the resin composition of the present invention.

Advantageous Effects

As apparent from the foregoing, the present invention advantageously provides a resin composition containing a polyvinyl chloride resin and an acrylic resin. Since the resin composition of the present invention contains a certain amount of the acrylic resin, the resin composition has excellent compatibility with the polyvinyl chloride resin, has high flexibility even with a low plasticizer content, and has excellent processability due to such properties. Therefore, both a calendering method and an extrusion method can be used to perform a manufacturing process using the resin composition.

In addition, the resin composition of the present invention and a board for interior materials manufactured using the same have excellent heat resistance due to high glass transition temperatures thereof, as compared with a conventional polyvinyl chloride resin composition and a board manufactured using only the polyvinyl chloride resin as a resin component.

BEST MODE

Hereinafter, the present invention will be described in detail.

The present invention relates to a resin composition containing a polyvinyl chloride resin and an acrylic resin. The resin composition includes 5 to 70 parts by weight of an acrylic resin, 1 to 15 parts by weight of a plasticizer, and 100 to 500 parts by weight of an inorganic filler based on 100 parts by weight of a polyvinyl chloride resin.

For example, the polyvinyl chloride resin may have a weight average molecular weight (Mw) of 50,000 to 150,000 g/mol or 70,000 to 130,000 g/mol. When the weight average molecular weight is less than the above range, the mechanical properties of a final product may be deteriorated. When the weight average molecular weight exceeds the above range, processability may be lowered. Thus, the polyvinyl chloride resin satisfying the above range may be used.

The acrylic resin may be added to prepare a resin composition having a high glass transition temperature, having high flexibility even with a low plasticizer content, and having excellent processability due to such properties. Poly(methyl methacrylate), which has a relatively high glass transition temperature and excellent impact resistance, may be used as the acrylic resin.

The poly(methyl methacrylate) may be a homopolymer of methyl methacrylate or a copolymer of methyl methacrylate and an acrylic monomer other than methyl methacrylate.

The acrylic monomer may be an alkyl acrylate monomer, or an alkyl methacrylate monomer, or a mixture of the alkyl acrylate monomer and the alkyl methacrylate monomer.

As the alkyl acrylate monomer, one or more selected from the group consisting of methyl acrylate, ethyl acrylate, n-propyl acrylate, isopropyl acrylate, n-butyl acrylate, isobutyl acrylate, sec-butyl acrylate, tert-butyl acrylate, methylbutyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate may be used.

As the alkyl methacrylate monomer, one or more selected from the group consisting of ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, and allyl methacrylate, other than methyl methacrylate, may be used.

The poly(methyl methacrylate) may further include other monomers besides the methyl methacrylate and the acrylic monomer.

The other monomers may include unsaturated carboxylic acids such as methacrylic acid, acrylic acid, and maleic anhydride; olefins such as ethylene, propylene, 1-butene, isobutylene, and 1-octene; conjugated diene compounds such as 1,3-butadiene, isoprene, and myrcene; aromatic vinyl compounds such as styrene, α-methylstyrene, p-methylstyrene, and m-methylstyrene; vinyl acetate; vinylpyridine; unsaturated nitriles such as acrylonitrile and methacrylonitrile; vinyl ketone; halogen-containing monomers such as vinyl chloride, vinylidene chloride, and vinylidene fluoride; and unsaturated amides such as acrylamide and methacrylamide.

As a specific example, the poly(methyl methacrylate) may be a copolymer of methyl methacrylate and methyl acrylate or a copolymer of methyl methacrylate, methyl acrylate, and methacrylic acid.

For example, the poly(methyl methacrylate) may have a glass transition temperature of 80 to 130° C. or 90 to 110° C. When the glass transition temperature is less than the above range, the degree of increase in the glass transition temperature of the resin composition may be insignificant. When the glass transition temperature exceeds the above range, the processability of the resin composition may be lowered. Thus, the poly(methyl methacrylate) satisfying the above range may be used.

The poly(methyl methacrylate) may have a weight average molecular weight (Mw) of 10,000 to 300,000 g/mol, 15,000 to 150,000 g/mol, or 20,000 to 130,000 g/mol. When the weight average molecular weight is less than the above range, polymerization reaction may not be performed properly. When the weight average molecular weight exceeds the above range, compatibility with the polyvinyl chloride resin may be degraded and processability may be lowered. Thus, the poly(methyl methacrylate) satisfying the above range may be used.

The acrylic resin may be contained in an amount of 5 to 70 parts by weight or 20 to 60 parts by weight based on 100 parts by weight of a polyvinyl chloride resin. When the amount is less than the above range, the degree of increase in the glass transition temperature of the resin composition may be insignificant. When the amount exceeds the above range, since an excess of the acrylic resin, which is about 2.5 times more expensive than the polyvinyl chloride resin, is contained, raw material costs are increased, and efficiency is decreased. Thus, the acrylic resin satisfying the above range may be used.

In addition, the resin composition of the present invention has excellent compatibility with the polyvinyl chloride resin and contains an acrylic resin having excellent processability, the content of a plasticizer may be minimized as compared with a conventional resin composition containing polyvinyl chloride alone.

The plasticizer may be a phthalate plasticizer, a terephthalate plasticizer, a benzoate plasticizer, a citrate plasticizer, a phosphate plasticizer, an adipate plasticizer, or a mixture thereof.

As the phthalate plasticizer, dioctyl phthalate, diethylhexyl phthalate, diisononyl phthalate, diisodecyl phthalate, dimethyl phthalate, diethyl phthalate, dibutyl phthalate, diheptyl phthalate, dinonyl phthalate, or ditridecyl phthalate may be used, without being limited thereto.

As the terephthalate plasticizer, dioctyl terephthalate may be used, without being limited thereto.

As the benzoate plasticizer, 2-(2-(2-phenylcarbonyloxyethoxy)ethoxy)ethyl benzoate, glyceryl tribenzoate, trimethylolpropane tribenzoate, isononyl benzoate, 1-methyl-2-(2-phenylcarbonyloxypropoxy)ethyl benzoate, 2,2,4-trimethyl-1,3-pentanediol dibenzoate, n-hexyl benzoate, or trimethylolpropane tribenzoate may be used, without being limited thereto.

As the citrate plasticizer, acetyl tributyl citrate or tributyl citrate may be used, without being limited thereto.

As the phosphate plasticizer, tricresyl phosphate or tributyl phosphate may be used, without being limited thereto.

As the adipate plasticizer, bis(2-ethylhexyl)adipate, dimethyl adipate, monomethyl adipate, dioctyl adipate, or diisononyl adipate may be used, without being limited thereto.

The plasticizer may be contained in an amount of 1 to 15 parts by weight or 1 to 10 parts by weight based on 100 parts by weight of a polyvinyl chloride resin. When the amount is less than the above range, the processability and physical properties of the resin composition may be deteriorated. When the amount exceeds the above range, the mechanical properties of a final product may be deteriorated. Thus, the plasticizer satisfying the above range may be used.

As the inorganic filler, one or more selected from the group consisting of calcium carbonate, amorphous silica, talc, zeolite, magnesium carbonate, calcium sulfate, calcium phosphate, magnesium phosphate, aluminum oxide, kaolin, and alumina trihydrate (ATH) may be used. In one embodiment of the present invention, low-cost calcium carbonate may be used.

The inorganic filler may be contained in an amount of 100 to 500 parts by weight or 200 to 450 parts by weight based on 100 parts by weight of a polyvinyl chloride resin. When the amount is less than the above range, physical properties may be deteriorated and costs may be increased. When the amount exceeds the above range, processability may be deteriorated. Thus, the inorganic filler satisfying the above range may be used.

The resin composition of the present invention may further include a heat stabilizer when necessary.

The heat stabilizer is a component necessary for processing conventional polyvinyl chloride resins, and as the heat stabilizer, epoxidized soybean oil, a metal salt, a calcium/zinc-based heat stabilizer, a barium/zinc-based heat stabilizer, or a mixture thereof may be used, without being limited thereto. In addition, the heat stabilizer may be contained in an amount of 2 to 6 parts by weight based on 100 parts by weight of a polyvinyl chloride resin.

In addition, the resin composition of the present invention may further include, when necessary, other additives for controlling the physical properties of a product manufactured using the resin composition. As the additives, one or more selected from the group consisting of melt strength reinforcing agents, lubricants, antistatic agents, ultraviolet absorbers, flame retardants, antioxidants, coloring agents, stabilizers, wetting agents, thickeners, foaming agents, defoaming agents, coagulants, gelling agents, sedimentation inhibitors, and anti-aging agents may be used, without being limited thereto. In addition, the contents of the additives are not particularly limited.

The resin composition of the present invention has a glass transition temperature of 70 to 95° C., 75 to 90° C., or 77 to 88° C. Since the resin composition of the present invention has a higher glass transition temperature than conventional polyvinyl chloride resin compositions, the resin composition has excellent heat resistance.

Since the resin composition of the present invention contains a certain amount of an acrylic resin, the resin composition has excellent compatibility with a polyvinyl chloride resin, has high flexibility even with a low plasticizer content, and has excellent processability due to such properties. Therefore, the resin composition is applicable to both a calendering method and an extrusion method due to excellent processability thereof.

In addition, the present invention relates to a board for interior materials manufactured using the resin composition.

Since the resin composition is the same as described above, duplicate description is omitted.

The board for interior materials may be manufactured by subjecting the resin composition to calendering molding or extrusion molding.

The calendering molding may be performed by passing the resin composition through a calender roll at 160 to 170° C.

In the extrusion molding, the resin composition is put into an extruder and melt-kneaded at a temperature of 180 to 200° C. Then, under the condition wherein temperature is gradually lowered toward a die (i.e., from 180° C. to 150° C.), the resin composition is molded using pressure drop while being extruded.

The board for interior materials may have a heat distortion temperature of 65 to 95° C., 70 to 90° C., or 75 to 85° C. Within this range, the board for interior materials of the present invention may have excellent heat resistance.

In addition, the board for interior materials may have a thickness of 1 to 10 mm or 1.5 to 7 mm, without being limited thereto. In addition, the thickness of the board may be changed as required.

When the board for interior materials of the present invention is used as a flooring material or a closet material, an interior finishing material such as wallpaper, paint, or a decorative film may be additionally attached to or painted on the surface of the board after the board is installed on walls or floors.

Alternatively, the board for interior materials of the present invention may be manufactured to have an integral structure in which an interior finishing material such as wallpaper, paint, or a decorative film is attached to or painted on one side or both sides of the board. The board having the integral structure may be installed on walls or floors.

The board for interior materials manufactured using the resin composition of the present invention has a higher heat distortion temperature than a board manufactured using only a polyvinyl chloride resin as a resin component. Thus, the board according to the present invention has excellent heat resistance.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXPERIMENTAL EXAMPLES

1. Preparation of Resin Composition and Measurement of Glass Transition Temperature The resin compositions of Examples 1 and 2, Comparative Examples 1 to 5, and Reference Example 1 were prepared according to the mixing ratios shown in Table 1 below, and the glass transition temperatures thereof were measured.

Glass transition temperatures were measured using a differential scanning calorimeter (DSC).

A polyvinyl chloride (PVC) resin (LS100, LG Chem, Ltd.) having a weight average molecular weight of 100,000 g/mol and a glass transition temperature of 80° C. was used.

As a plasticizer, dioctyl terephthalate (DOTP, LG Chem, Ltd.) was used.

In PMMA 1, an acrylic resin having a weight average molecular weight of 43,000 g/mol and a glass transition temperature of 105° C. was used.

In PMMA 2, an acrylic resin having a weight average molecular weight of 91,000 g/mol and a glass transition temperature of 92° C. was used.

In PMMA 3, an acrylic resin having a weight average molecular weight of 400,000 g/mol and a glass transition temperature of 108° C. was used.

As an inorganic filler, calcium carbonate ($CaCO_3$) was used.

As a heat stabilizer, a Ba/Zn-based stabilizer was used.

TABLE 1

| | | Example 1 | Example 2 | Comparative Example 1 | Comparative Example 2 | Comparative Example 3 | Comparative Example 4 | Comparative Example 5 | Reference Example 1 |
|---|---|---|---|---|---|---|---|---|---|
| Content (parts by weight) | PVC | 100 | 100 | 100 | 100 | 100 | 100 | 100 | 100 |
| | DOTP | 7 | 7 | 25 | 7 | 7 | 20 | 20 | 7 |
| | PMMA 1 (Mw: 43,000 g/mol) | 50 | — | — | 80 | 3 | 50 | 80 | — |
| | PMMA 2 (Mw: 91,000 g/mol) | — | 50 | — | — | — | — | — | — |
| | PMMA 3 (Mw: 400,000 g/mol) | — | — | — | — | — | — | — | 50 |
| | Inorganic filler | 300 | 300 | 300 | 300 | 300 | 300 | 300 | 300 |
| | Heat stabilizer | 3 | 3 | 3 | 3 | 3 | 3 | 3 | 3 |
| Glass transition temperature (° C.) | | 81 | 81 | 30 | 90 | 68 | 55 | 64 | 81 |

2. Evaluation of Physical Properties of Board for Interior Materials Manufactured Using Resin Composition Each of the resin compositions prepared in the above experiments was passed through a calendar roll at 160 to 170° C. to manufacture a board for interior materials having a length, a width, and a thickness of 300 mm×200 mm×4 mm.

Heat Distortion Temperature (Heat Resistance)

The heat distortion temperatures of the boards for interior materials were measured according to Standard ISO 75-1, and the results are shown in Table 2 below.

Specifically, each board was cut to prepare a specimen having a length, a width, and a thickness of 80 mm×10 mm×4 mm, and the prepared specimen was placed on a support in an oil-containing heat bath so that the specimen was immersed in the oil to a depth of at least 50 mm. Thereafter, a load of 80 g was applied to the specimen, and the distortion value of the specimen after 5 minutes was set to zero. Then, when the temperature of the heat bath was raised at a constant rate of 120±10° C./h, the specimen sagged under the load. At this time, temperature at which the specimen was distorted by 0.3 mm was measured.

Processability

Processability was measured when the boards for interior materials were manufactured by a calendering method, and the results are shown in Table 2 below.

Specifically, each board was molded in a calender roll, and then processability was evaluated by visually checking the surface of the molded board.

(Good: surface of molded board is smooth)
(Bad: surface of molded board is not smooth and is rough)

TABLE 2

| | | Example 1 | Example 2 | Comparative Example 1 | Comparative Example 2 | Comparative Example 3 | Comparative Example 4 | Comparative Example 5 | Reference Example 1 |
|---|---|---|---|---|---|---|---|---|---|
| Content (parts by weight) | PVC | 100 | 100 | 100 | 100 | 100 | 100 | 100 | 100 |
| | DOTP | 7 | 7 | 25 | 7 | 7 | 20 | 20 | 7 |
| | PMMA 1 (Mw: 43,000 g/mol) | 50 | — | — | 80 | 3 | 50 | 80 | — |
| | PMMA 2 (Mw: 91,000 g/mol) | — | 50 | — | — | — | — | — | — |
| | PMMA 3 (Mw: 400,000 g/mol) | — | — | — | — | — | — | — | 50 |
| | Inorganic filler | 300 | 300 | 300 | 300 | 300 | 300 | 300 | 300 |
| | Heat stabilizer | 3 | 3 | 3 | 3 | 3 | 3 | 3 | 3 |
| Heat distortion temperature (° C.) | | 77 | 78 | 26 | 86 | 64 | 51 | 60 | 76 |
| Processability | | Good | Good | Good | Good | Bad | Good | Good | Bad |

As shown in Table 1, it can be confirmed that the glass transition temperatures of the resin compositions of Examples 1 and 2, in which an acrylic resin is mixed in a certain ratio, are significantly higher than that of the resin composition of Comparative Example 1, in which a polyvinyl chloride resin alone is contained.

In addition, as shown in Table 2, it can be confirmed that the heat distortion temperatures of the boards of Examples 1 and 2 are significantly higher than that of the board of Comparative Example 1 not containing an acrylic resin. These results indicate that the boards of Examples 1 and 2 have excellent heat resistance.

In addition, compared with Comparative Example 1, since each of the compositions of Examples 1 and 2 contains a certain amount of an acrylic resin, the compositions according to Examples 1 and 2 have excellent compatibility with a polyvinyl chloride resin and have excellent processability even when the plasticizer content is less than ⅓ of that in Comparative Example 1. Due to these properties, calendering molding may be applied to the manufacture of boards using the compositions of Examples 1 and 2.

In addition, in the case of Comparative Example 2, since an excess of an acrylic resin is present, raw material cost may be increased. Accordingly, Comparative Example 2 is not preferable. In the case of Comparative Example 3, since the amount of the acrylic resin contained is less than the specific content, rise of the glass transition temperature is insignificant, and the heat distortion temperature of the board of Comparative Example 3 is lower than those of the boards of Examples 1 and 2. In addition, processability is also deteriorated.

In addition, it can be confirmed that the glass transition temperature and the heat distortion temperature of Comparative Example 4, in which an excess of a plasticizer is present, are much lower than those of Examples 1 and 2.

In addition, it can be confirmed that, in the case of Comparative Example 5, in which an excess of an acrylic resin and an excess of a plasticizer are present, processability is excellent, but the glass transition temperature and the heat distortion temperature are much lower than those of Examples 1 and 2.

In addition, it can be confirmed that, in the case of Reference Example 1, in which an acrylic resin having a weight average molecular weight of more than 300,000 g/mol is used, processability is deteriorated.

The invention claimed is:

1. A resin composition, comprising:
    50 to 60 parts by weight of a poly(methyl methacrylate);
    1 to 7 parts by weight of a plasticizer; and
    200 to 450 parts by weight of an inorganic filler, and 100 parts by weight of a polyvinyl chloride resin,
    wherein the poly(methyl methacrylate) has a glass transition temperature of 92 to 130° C.

2. The resin composition according to claim 1, wherein the polyvinyl chloride resin has a weight average molecular weight (Mw) of 50,000 to 150,000 g/mol.

3. The resin composition according to claim 1, wherein the poly(methyl methacrylate) is a copolymer of methyl methacrylate, methyl acrylate, and methacrylic acid.

4. The resin composition according to claim 1, wherein the poly(methyl methacrylate) has a weight average molecular weight (Mw) of 10,000 to 300,000 g/mol.

5. The resin composition according to claim 1, wherein the plasticizer is a phthalate plasticizer, a terephthalate plasticizer, a benzoate plasticizer, a citrate plasticizer, a phosphate plasticizer, an adipate plasticizer, or a mixture thereof.

6. The resin composition according to claim 1, wherein the inorganic filler is calcium carbonate.

7. The resin composition according to claim 1, wherein the resin composition further comprises 2 to 6 parts by weight of a heat stabilizer based on 100 parts by weight of the polyvinyl chloride resin.

8. The resin composition according to claim 1, wherein the resin composition has a glass transition temperature of 70 to 95° C.

9. The resin composition according to claim 1, wherein the resin composition has a glass transition temperature of 75 to 90° C.

10. The resin composition according to claim 1, wherein the resin composition has a glass transition temperature of 77 to 88° C.

11. A board for interior materials manufactured using the resin composition according to claim 1.

12. The board according to claim 11, wherein the board for interior materials has a heat distortion temperature of 65 to 95° C.

13. The board according to claim 11, wherein the board for interior materials has a heat distortion temperature of 70 to 90° C.

\* \* \* \* \*